(12) United States Patent
Lord

(10) Patent No.: US 10,441,895 B2
(45) Date of Patent: Oct. 15, 2019

(54) METHOD AND APPARATUS FOR IMPROVED EFFLUENT FREE SEA WATER DESALINATION

(71) Applicant: Effluent Free Desalination Corp., North Highlands, CA (US)

(72) Inventor: Michael John Lord, Antelope, CA (US)

(73) Assignee: Effluent Free Desalination Corp., North Highlands, CA (US)

(*) Notice: Subject to any disclaimer, the term of this patent is extended or adjusted under 35 U.S.C. 154(b) by 102 days.

(21) Appl. No.: 15/539,609

(22) PCT Filed: Dec. 23, 2014

(86) PCT No.: PCT/US2014/072273
§ 371 (c)(1),
(2) Date: Jun. 23, 2017

(87) PCT Pub. No.: WO2016/105403
PCT Pub. Date: Jun. 30, 2016

(65) Prior Publication Data
US 2017/0348608 A1     Dec. 7, 2017

(51) Int. Cl.
*C02F 1/04* (2006.01)
*B01D 1/28* (2006.01)
(Continued)

(52) U.S. Cl.
CPC ......... *B01D 1/2881* (2013.01); *B01D 1/0047* (2013.01); *B01D 1/221* (2013.01);
(Continued)

(58) Field of Classification Search
CPC .... B01D 1/0047; B01D 1/221; B01D 1/2881; B01D 5/006; C02F 1/04; C02F 1/041; C02F 1/10
See application file for complete search history.

(56) References Cited

U.S. PATENT DOCUMENTS 3,607,668 A * 9/1971 Williamson ............... C02F 1/04
203/11
3,673,699 A * 7/1972 Buffington ............... F26B 17/04
34/236

(Continued)

FOREIGN PATENT DOCUMENTS

WO     WO-0015558 A1 *  3/2000 ........... B01D 1/0058

*Primary Examiner* — Jonathan Miller
(74) *Attorney, Agent, or Firm* — Katten Muchin Rosenman LLP

(57) ABSTRACT

A system has a first plate heat exchanger at a first pressure to heat a fluid containing dissolved solids to form a heated fluid at a temperature below the boiling point of the fluid. A vaporization chamber is connected to the first plate heat exchanger. The vaporization chamber is at a second pressure below the first pressure. The vaporization chamber receives the heated fluid and produces a gaseous component substantially free of dissolved solids and a solids component. A compressor is connected to the vaporization chamber. The compressor receives the gaseous component and produces a fluidic output. The first plate heat exchanger has plates forming chambers. A manifold arrangement distributes an unprocessed fluid from the vaporization chamber to a first subset of the chambers and distributes the fluidic output from the compressor to a second subset of the chambers.

37 Claims, 5 Drawing Sheets

(51) Int. Cl.
*C02F 1/10* (2006.01)
*B01D 5/00* (2006.01)
*B01D 1/00* (2006.01)
*B01D 1/22* (2006.01)
*C02F 103/08* (2006.01)

(52) U.S. Cl.
CPC ............... B01D 5/006 (2013.01); C02F 1/04 (2013.01); C02F 1/041 (2013.01); C02F 1/10 (2013.01); *C02F 2103/08* (2013.01); *Y02A 20/128* (2018.01)

(56) References Cited

U.S. PATENT DOCUMENTS

| | | | | |
|---|---|---|---|---|
| 3,956,072 A * | 5/1976 | Huse | ...................... | B01D 1/289 202/177 |
| 4,116,756 A * | 9/1978 | Quee | ........................ | B01D 1/18 139/413 |
| 4,671,856 A * | 6/1987 | Sears | ...................... | B01D 1/221 159/24.2 |
| 4,769,113 A * | 9/1988 | Sears | ...................... | B01D 1/221 159/24.2 |
| 4,844,151 A * | 7/1989 | Cohen | ................... | F28D 9/0068 165/44 |
| 4,869,067 A * | 9/1989 | Sears | ...................... | B01D 1/221 60/645 |
| 5,587,054 A * | 12/1996 | Keith | ................... | B01D 1/2856 159/24.1 |
| 5,858,177 A * | 1/1999 | Morris | ................... | B01D 1/221 203/26 |
| 5,925,223 A * | 7/1999 | Simpson | ................ | B01D 3/065 203/11 |
| 5,968,321 A * | 10/1999 | Sears | ...................... | B01D 1/221 202/172 |
| 6,365,005 B1 * | 4/2002 | Schleiffarth | ......... | B01D 1/2818 159/24.1 |
| 8,496,787 B2 * | 7/2013 | Lord | ........................ | B01D 1/28 203/10 |
| 8,628,604 B2 * | 1/2014 | Moll | ...................... | B01D 3/007 95/257 |
| 9,808,739 B2 * | 11/2017 | Fincher | .............. | B01D 17/0217 |

* cited by examiner

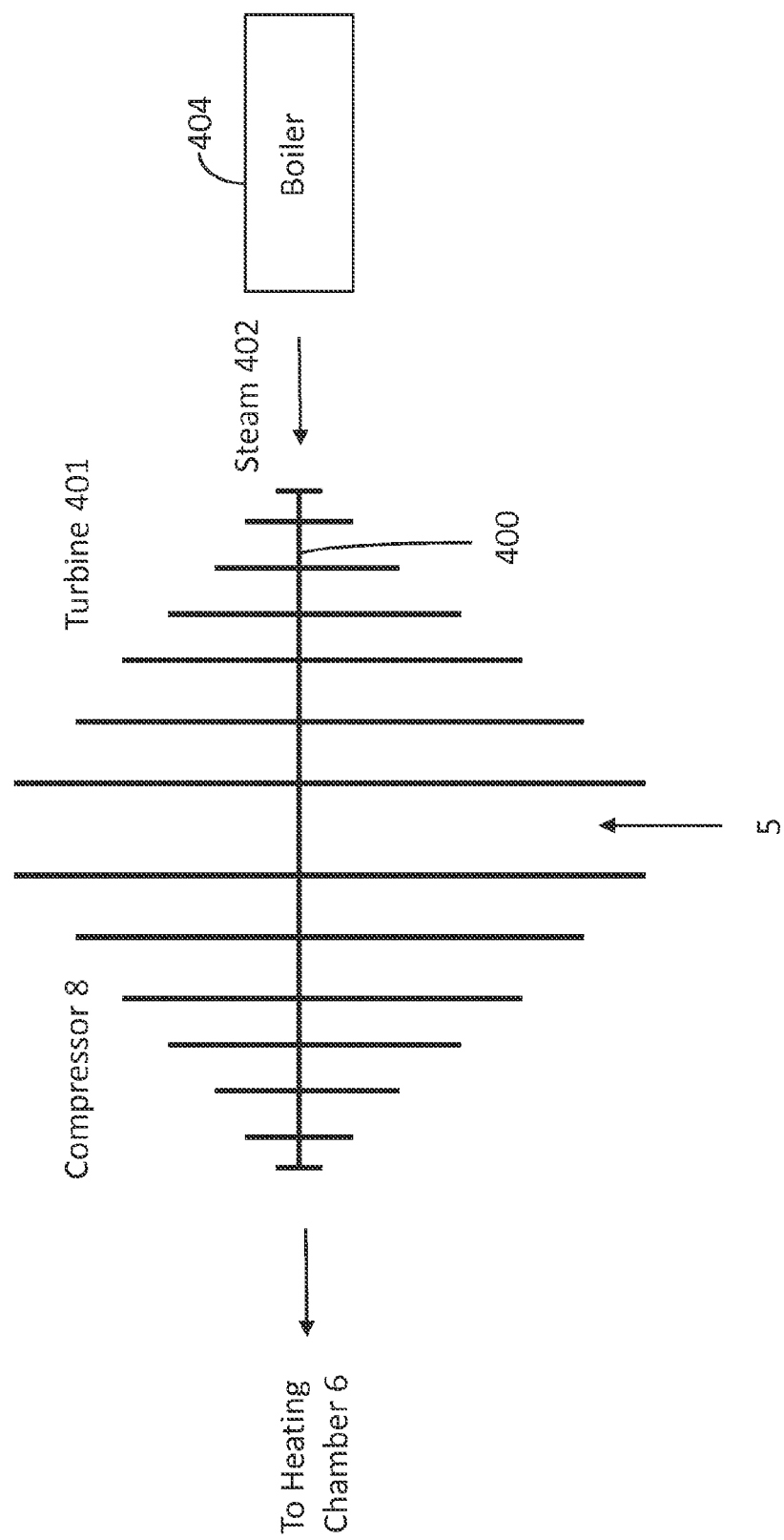

US 10,441,895 B2

METHOD AND APPARATUS FOR IMPROVED EFFLUENT FREE SEA WATER DESALINATION

CROSS REFERENCE TO RELATED APPLICATION

This application claims priority to International Patent Application no. PCT/RU2013/000769 filed Sep. 4, 2013, the contents of which are incorporated herein by reference.

FIELD OF THE INVENTION

This invention relates generally to sea water desalination. More particularly, this invention relates to techniques for improved effluent free sea water desalination.

BACKGROUND OF THE INVENTION

U.S. Pat. No. 8,496,787 (the '787 patent) describes techniques for effluent free sea water desalination. The technology disclosed in the '787 patent is of growing interest in a large number of venues. Accordingly, there is a need for improvements upon the techniques disclosed in the '787 patent.

SUMMARY OF THE INVENTION

A system has a first plate heat exchanger at a first pressure to heat a fluid containing dissolved solids to form a heated fluid at a temperature below the boiling point of the fluid. A vaporization chamber is connected to the first plate heat exchanger. The vaporization chamber is at a second pressure below the first pressure. The vaporization chamber receives the heated fluid and produces a gaseous component substantially free of dissolved solids and a solids component. A compressor is connected to the vaporization chamber. The compressor receives the gaseous component and produces a fluidic output. The first plate heat exchanger has plates forming chambers. A manifold arrangement distributes an unprocessed fluid from the vaporization chamber to a first subset of the chambers and distributes the fluidic output from the compressor to a second subset of the chambers, such that the first plate heat exchanger forms the heated fluid for application to the vaporization chamber.

A system includes a heater at a first pressure to heat a fluid containing dissolved solids to form a heated fluid at a temperature below the boiling point of the fluid. A vaporization chamber is connected to the heater. The vaporization chamber is at a second pressure below the first pressure. The vaporization chamber receives the heated fluid and produces a gaseous component substantially free of dissolved solids and a solids component. A compressor is connected to the vaporization chamber. The compressor receives the gaseous component and produces a fluidic output. A condensing unit is integrated with the heater. The condensing unit receives the fluidic output. The fluidic output applies heat to the fluid within the heater. A plate heat exchanger is connected to the condensing unit and the vaporization chamber. The plate heat exchanger has plates forming chambers. A manifold arrangement distributes a cold unprocessed fluid to a first subset of the chambers and distributes the fluidic output from the condensing unit to a second subset of the chambers. As a result, the plate heat exchanger forms a hot unprocessed fluid output for application to the vaporization chamber and a cold processed fluid output.

BRIEF DESCRIPTION OF THE FIGURES

The invention is more fully appreciated in connection with the following detailed description taken in conjunction with the accompanying drawings, in which:

FIG. 4 illustrates a compressor assembly that may be used in accordance with an embodiment of the invention.

Like reference numerals refer to corresponding parts throughout the several views of the drawings.

DETAILED DESCRIPTION OF THE INVENTION

Figure 1:
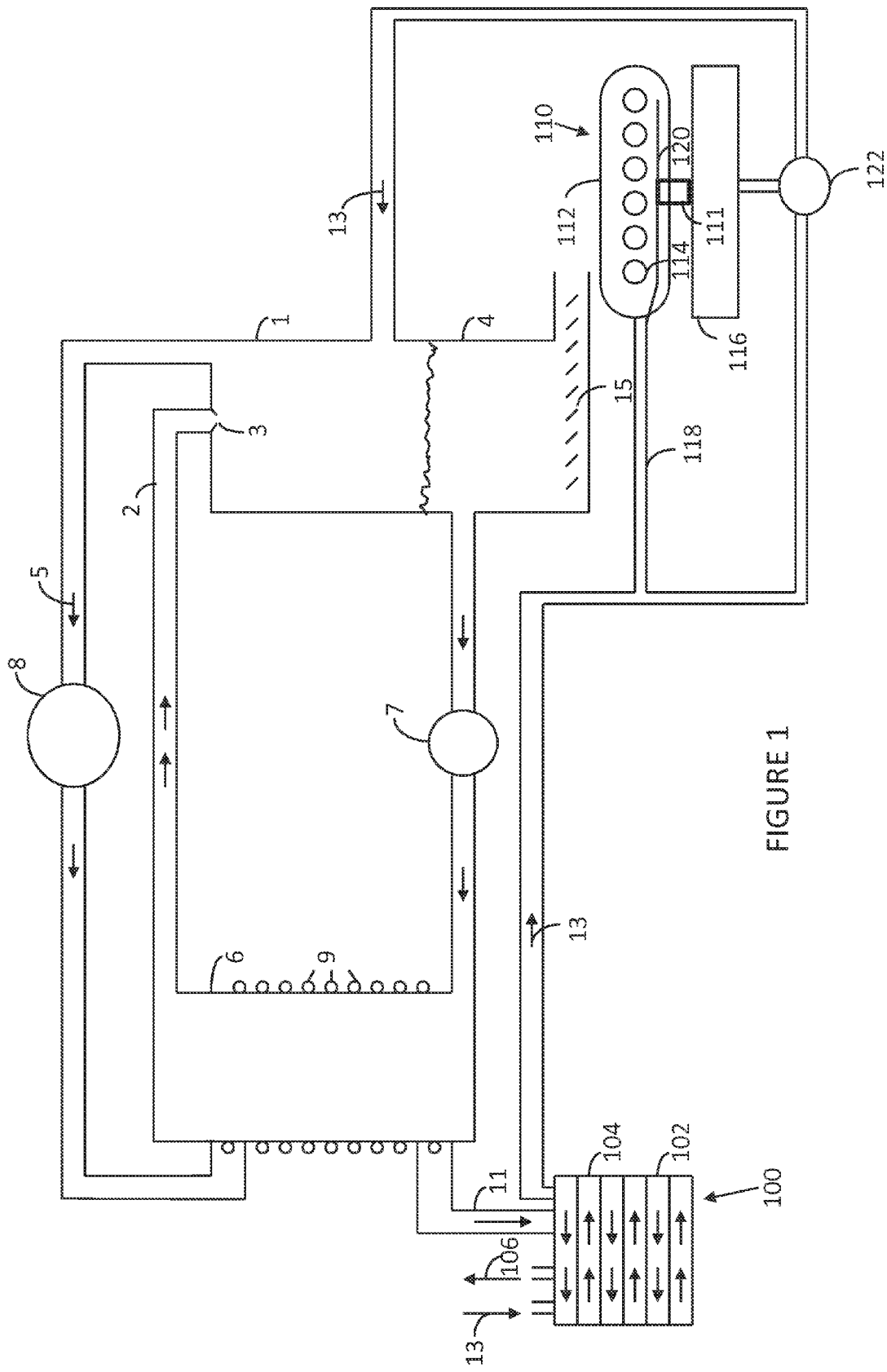
FIG. 1 illustrates a system configured in accordance with an embodiment of the invention.

FIG. 1 illustrates the base technology of the '787 patent along with enhancements disclosed herein. The single digit and two digit numbering in FIG. 1 is the same as the numbering used in the '787 patent. In particular, the '787 patent discloses a vaporization chamber 1. The vaporization chamber 1 includes a nozzle 3 attached to a connection pipe 2. The connection pipe 2 is attached to a heater 6. The heater is at a first pressure to heat a fluid containing dissolved solids. This forms a heated fluid at a temperature below the boiling point of the fluid. The heater receives heat from a condensing unit 9 and any type of external heating source, if necessary. The vaporization chamber receives the heated fluid from the heater 6 via connection pipe 2. The nozzle 3 creates a spray, which reduces the pressure associated with the heated fluid. The reduced pressure renders the fluid at its boiling point. As a result, a gaseous component substantially free of dissolved solids is formed along with a solids component. The gaseous component 5 is applied to a compressor 8. The solids component settles in the vaporization chamber. More particularly, the solids component settles into un-evaporated liquid 4, which is fed with a raw liquid input 13.

The compressor 8 receives the gaseous component and produces a fluidic output, which is applied to the condensing unit 9. The condensing unit 9 is integrated with the heater. The fluidic output circulating in the condensing unit 9 applies heat to the fluid within the heater 6. Pump 7 transfers fluid 4 from the evaporation chamber 1 into the heater 6.

The foregoing description is consistent with the information disclosed in the '787 patent. The following information is directed toward enhancements on the base technology described in the '787 patent.

A first enhancement is the utilization of a heat exchanger 100. Any type of heat exchanger 100 may be used in accordance with embodiments of the invention. One embodiment of the invention utilizes a plate heat exchanger. As is known in the art, a plate heat exchanger uses metal plates to transfer heat between two fluids. The plates form a set of chambers with the two fluids being routed through alternating chambers. A manifold arrangement distributes a cold fluid to a first subset of chambers and a hot fluid to a second subset of chambers. In the current context, raw liquid input 13 (e.g., sea water) is the cold fluid input, while distilled pure liquid 11 from the condensing unit 9 is the hot fluid input. Alternate chambers 102 (e.g., for the cold fluid) and 104 (e.g., for the hot fluid) produce a cold processed fluid output 106 and a hot unprocessed fluid output 13 for application to the vaporization chamber 1. Two arrows are illustrated in each chamber of heat exchanger 100 to represent the transition in temperature of the fluid (i.e., from hot to cold or cold to hot) as it traverses the chamber.

Figure 2:
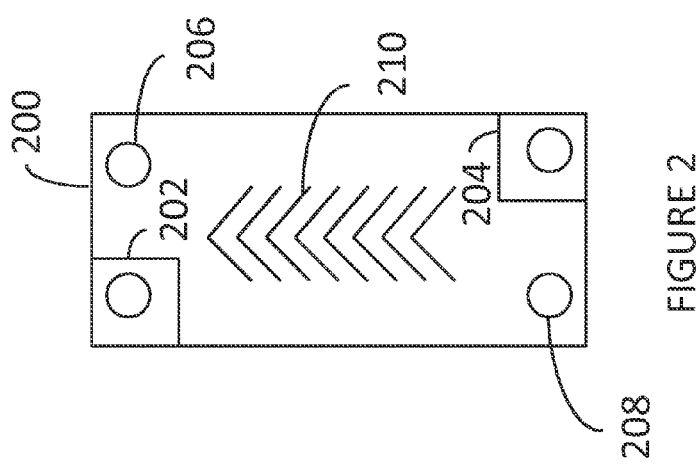
FIG. 2 illustrates a plate and manifold components utilized in a plate heat exchanger.

FIG. 2 illustrates a sample plate 200. The plate 200 has two apertures 202 and 204 with an associated gasket or brazing to form a manifold to pass fluid to an adjacent chamber. Apertures 206 and 208 receive and emit a fluid that is processed in the chamber defined by the plate 200. The plate 200 may include corrugations 210 to increase fluid turbulence for enhanced heat exchange effects. The plate 200 has a large surface area to which the fluid is exposed. This facilitates the transfer of heat and increases the speed of temperature change.

Figure 3:
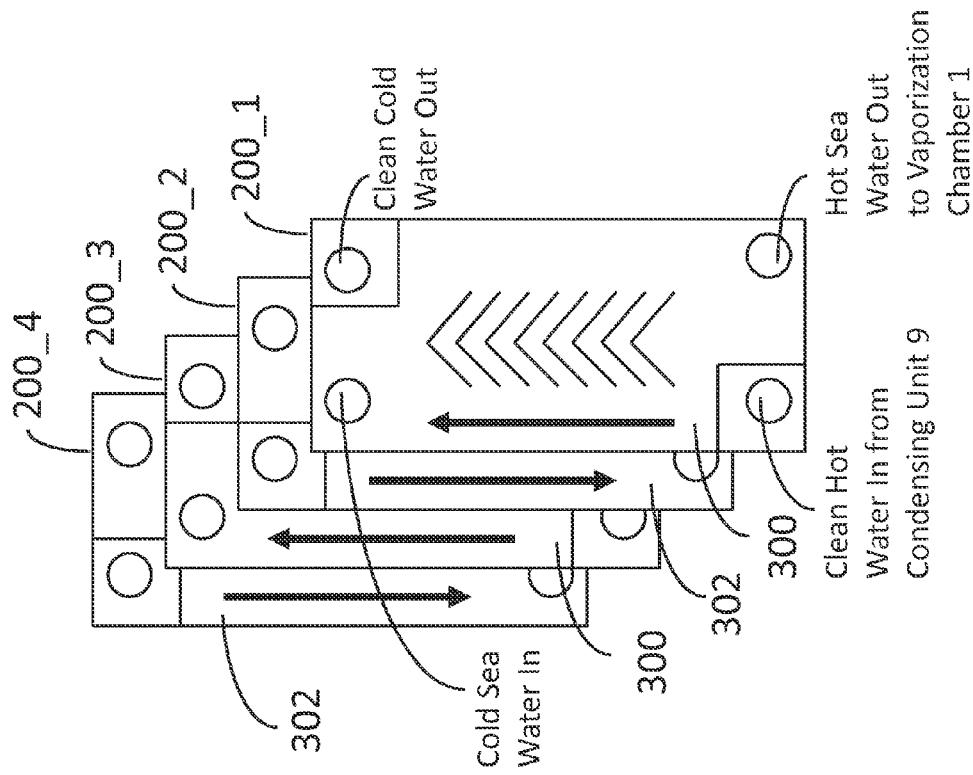
FIG. 3 illustrates a plate heat exchanger utilized in accordance with an embodiment of the invention.

FIG. 3 illustrates an arrangement of plates 200_1 through 200_4 that may be assembled to form a plate heat exchanger. Individual plates may use gaskets, welds or brazing for attachment to an adjacent plate. The plates are compressed together in a rigid frame to form an arrangement of parallel flow channels with alternating hot and cold fluids. A terminal plate (not shown) reverses the flow back to plate 200_1. Thus, each fluid moves from plate 200_1 in a first direction through a series of alternate chambers; the fluid flow is reversed and the fluid moves in a second direction through a series of alternate chambers.

Cold sea water may enter the plate heat exchanger and then traverse alternate chambers 300 to emerge as hot sea water for application to the vaporization chamber 1. Clean hot water from condensing unit 9 may enter the plate heat exchanger and then traverse alternate chambers 302 to emerge as clean cold water output.

The heat exchanger 100 is pressurized to prevent deposits from building up on the plates 200. Advantageously, the plate type heat exchanger is extremely efficient, low-cost and compact.

Returning to FIG. 1, the enhanced system includes a conveyor belt 110. A commercially available conveyor belt may be used in accordance with embodiments of the invention, such as those sold by Komline-Sanderson, Peapack, N.J. The conveyor belt 110 has a frame 111, belt 112 and internal bearings 114.

The belt 112 uses a material suitable for high temperature filtering processes. In one embodiment, the belt 112 is formed of polyester. In one embodiment, the polyester has tensile strength of approximately 750 pounds per inch. The belt 112 may have a thickness of approximately 0.05 inch. The belt 112 may have a thread count between approximately 118 by 30 per square inch. The belt 112 may have a volumetric air flow of between approximately 170 and 230 cubic feet per minute.

FIG. 1 illustrates an augur 15, which may be used for solid removal and deposition on the conveyor belt 110. Other solid moving mechanisms may also be used, such as a pump. The vaporization chamber 1 produces solid salt. The salt is mixed with water that may have a concentration of 100% brine. The salt solids at the bottom of the evaporation chamber 1 are removed along with a substantial quantity of water. The conveyor belt 110 receives this combination of solids and water. The solids are trapped by the belt 112 and are ejected at the end of the belt 112. Water passes through the belt 112 and is collected in a fluid recapture repository 116. The water passing through the belt has a high concentration of solid salt, which clogs the openings in the belt. Accordingly, an embodiment of the invention uses a tap 118 to access raw liquid input 13. The tap 118 is connected to a fluid delivery mechanism 120. The fluid delivery mechanism may include nozzles or jets that spray the raw liquid input on the belt to keep the belt relatively clean. A pump 122 may be used to move fluid from the fluid recapture repository 116 to the vaporization chamber 1.

Another enhancement relates to the compressor 8. The compressor 8 may be connected to a steam turbine. FIG. 4 illustrates such an arrangement. In particular, compressor 8 is on a shaft 400, which is also connected to a turbine 401. Turbine 401 receives steam 402 from a boiler 404. The boiler 404 may be heated with natural gas. The axial shaft 400 may be replaced with a connecting drive from the power producing steam to the power consuming compressor.

Figure 5:
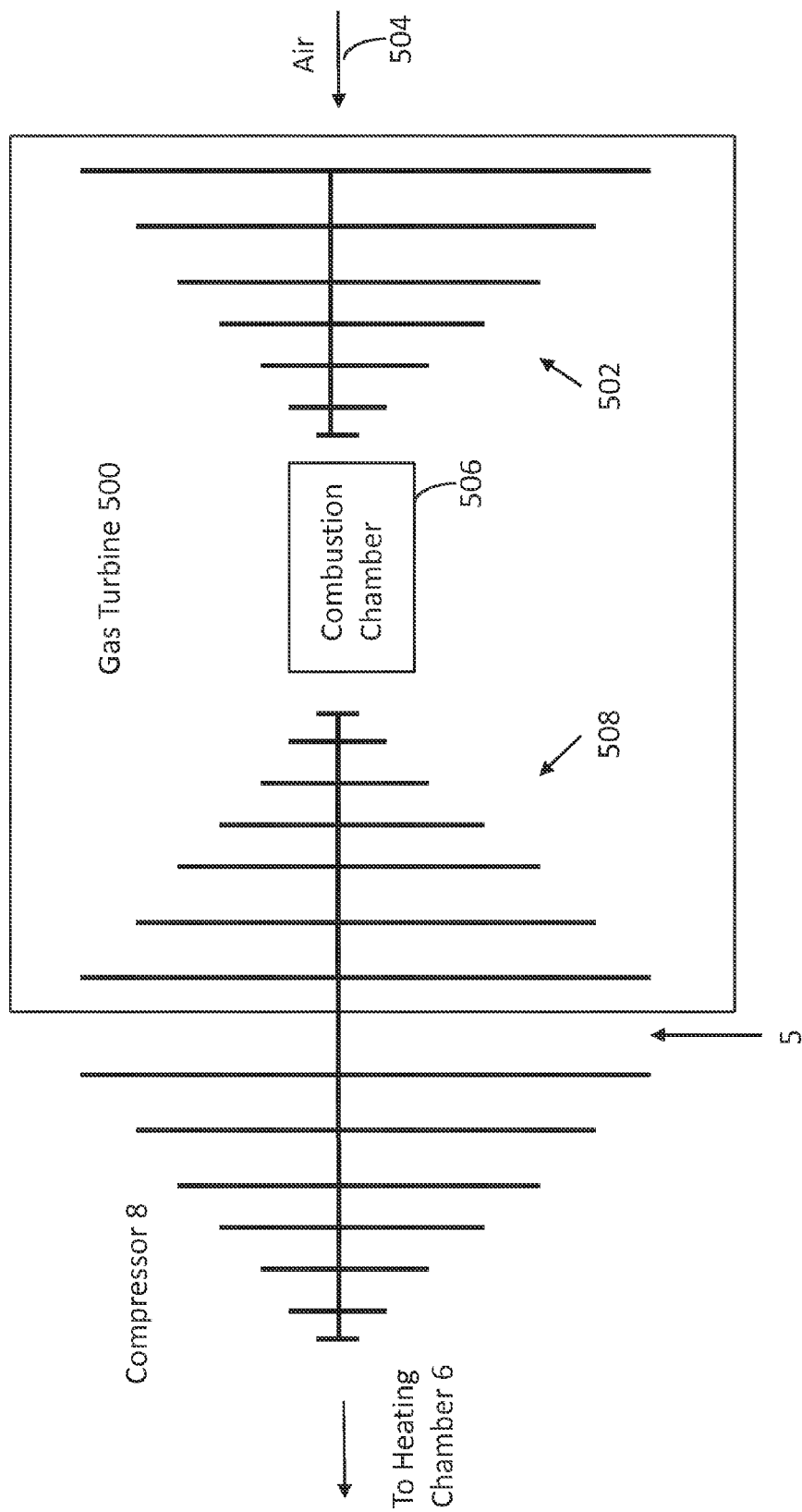
FIG. 5 illustrates an alternate compressor assembly that may be used in accordance with an embodiment of the invention.

FIG. 5 illustrates another compressor arrangement that may be used in accordance with an embodiment of the invention. In this arrangement, the compressor 8 is connected to a gas turbine 500. The gas turbine 500 includes a compressor 502 that receives air 504. A combustion chamber 506 produces expanded exhaust to drive turbine 508, which drives compressor 8.

Figure 6:
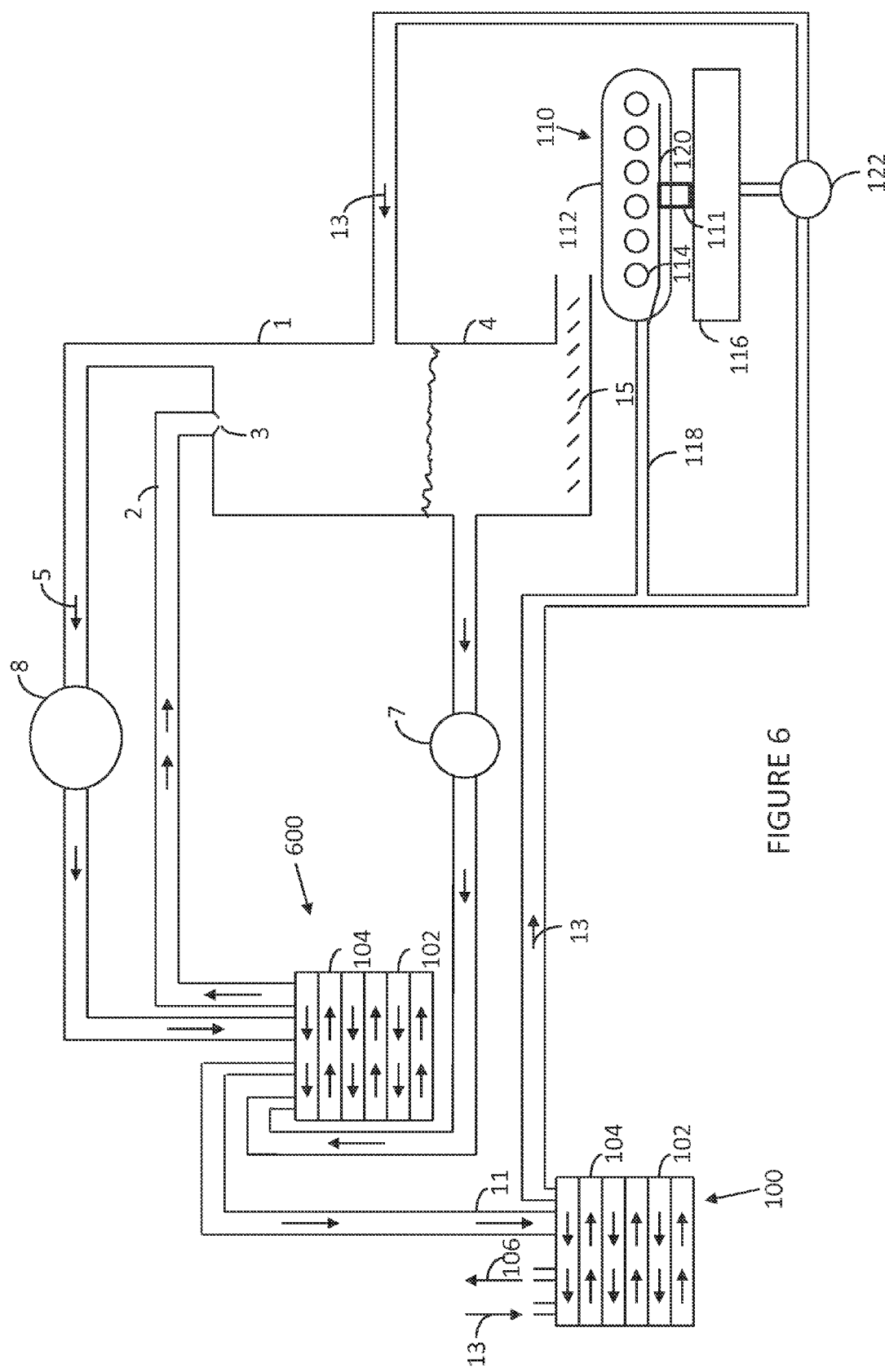
FIG. 6 is a dual plate heat exchanger system utilized in accordance with an embodiment of the invention.

FIG. 6 illustrates a dual plate type heat exchanger system utilized in accordance with an embodiment of the invention. FIG. 6 corresponds to FIG. 1, but the heater 6 and condensing unit 9 are replaced with a plate heat exchanger 600. One input to the plate heat exchanger 600 is the output of the compressor 8. This output is processed through alternate chambers of the plate heat exchanger 600 and emerges as distilled pure liquid output 11, which is applied to plate heat exchanger 100. The other input to the plate heat exchanger 600 is un-evaporated liquid 4 from the vaporization chamber 1. This liquid is processed through alternate chambers of the plate heat exchanger 600, where it acquires heat from the output of the compressor 8. The heated fluid is then applied to connection pipe 2 for routing to vaporization chamber 1.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A system, comprising:
    a first plate heat exchanger at a first pressure to heat a fluid containing dissolved solids to form a heated fluid at a temperature below the boiling point of the fluid;
    a vaporization chamber connected to the first plate heat exchanger, the vaporization chamber at a second pressure below the first pressure, wherein the vaporization chamber receives the heated fluid and produces a gaseous component substantially free of dissolved solids and a solids component, where the vaporization chamber includes a nozzle attached to a connection pipe through which the received heated fluid flows;

a fluid recapture repository connected to the vaporization chamber; and a compressor connected to the vaporization chamber, the compressor receiving the gaseous component from the vaporization chamber and producing a fluidic output;

wherein the first plate heat exchanger comprises
- a plurality of plates forming a plurality of chambers, and
- a manifold arrangement to distribute an unprocessed fluid from the vaporization chamber to a first subset of the plurality of chambers and distribute the fluidic output from the compressor to a second subset of the plurality of chambers, such that the first plate heat exchanger forms a hot unprocessed fluid output for application to the vaporization chamber.

2. The system of claim 1 further comprising:
a second plate heat exchanger connected to the first plate heat exchanger and the vaporization chamber, the second plate heat exchanger comprising
a second plurality of plates forming a second plurality of chambers, and
a second manifold arrangement to distribute a cold unprocessed fluid to a first subset of the second plurality of chambers and distribute fluidic output from the first plate heat exchanger to a second subset of the second plurality of chambers, such that the second plate heat exchanger forms a hot unprocessed fluid output for application to the vaporization chamber and a cold processed fluid output.

3. The system of claim 1 further comprising a conveyor belt, wherein the conveyor belt is connected to the vaporization chamber such that the conveyor belt collects the solids from the vaporization chamber.

4. The system of claim 3 wherein the vaporization chamber includes means for moving the solids component to the conveyor belt.

5. The system of claim 4 wherein the means for moving is an augur.

6. The system of claim 4 wherein the means for moving is a pump.

7. The system of claim 3 wherein the conveyor belt has a belt formed of polyester.

8. The system of claim 7 wherein the polyester has tensile strength of approximately 750 pounds per inch.

9. The system of claim 7 wherein the polyester has a thickness of approximately 0.05 inch.

10. The system of claim 7 wherein the polyester has a thread count between approximately 118 by 30 per square inch.

11. The system of claim 7 wherein the polyester has a volumetric air flow of between approximately 170 and 230 cubic feet per minute.

12. The system of claim 3 wherein the conveyor belt has a frame and internal bearings.

13. The system of claim 12 wherein the conveyor belt has a fluid delivery mechanism to rinse the belt of the conveyor belt.

14. The system of claim 13 wherein the fluid delivery mechanism processes the hot unprocessed fluid output.

15. The system of claim 3 wherein the conveyor belt has an associated fluid recapture repository.

16. The system of claim 15 further comprising a pump between the fluid recapture repository and the vaporization chamber.

17. The system of claim 1 wherein the compressor is connected to a steam turbine.

18. The system of claim 17 wherein the steam turbine has a boiler heated with natural gas.

19. The system of claim 1 wherein the compressor is connected to a gas turbine.

20. A system, comprising:
a heater at a first pressure to heat a fluid containing dissolved solids to form a heated fluid at a temperature below the boiling point of the fluid;

a vaporization chamber connected to the heater, the vaporization chamber at a second pressure below the first pressure, wherein the vaporization chamber receives the heated fluid and produces a gaseous component substantially free of dissolved solids and a solids component, where the vaporization chamber includes a nozzle attached to a connection pipe through which the received heated fluid flows;

a fluid recapture repository connected to the vaporization chamber;

a compressor connected to the vaporization chamber, the compressor receiving the gaseous component from the vaporization chamber and producing a fluidic output;

a condensing unit integrated with the heater, the condensing unit receiving the fluidic output, the fluidic output applying heat to the fluid within the heater; and a plate heat exchanger connected to the condensing unit and the vaporization chamber, the plate heat exchanger comprising
a plurality of plates forming a plurality of chambers, and
a manifold arrangement to distribute a cold unprocessed fluid to a first subset of the plurality of chambers and distribute the fluidic output from the condensing unit to a second subset of the plurality of chambers, such that the plate heat exchanger forms a hot unprocessed fluid output for application to the vaporization chamber and a cold processed fluid output.

21. The system of claim 20 further comprising a conveyor belt, wherein the conveyor belt is connected to the vaporization chamber.

22. The system of claim 21 wherein the vaporization chamber includes means for moving the solids component to the conveyor belt.

23. The system of claim 22 wherein the means for moving is an augur.

24. The system of claim 22 wherein the means for moving is a pump.

25. The system of claim 21 wherein the conveyor belt has a belt formed of polyester.

26. The system of claim 25 wherein the polyester has tensile strength of approximately 750 pounds per inch.

27. The system of claim 25 wherein the polyester has a thickness of approximately 0.05 inch.

28. The system of claim 25 wherein the polyester has a thread count between approximately 118 by 30 per square inch.

29. The system of claim 25 wherein the polyester has a volumetric air flow of between approximately 170 and 230 cubic feet per minute.

30. The system of claim 21 wherein the conveyor belt has a frame and internal bearings.

31. The system of claim 30 wherein the conveyor belt has a fluid delivery mechanism to rinse the belt of the conveyor belt.

32. The system of claim 31 wherein the fluid delivery mechanism processes the hot unprocessed fluid output.

33. The system of claim 21 wherein the conveyor belt has an associated fluid recapture repository.

34. The system of claim 33 further comprising a pump between the fluid recapture repository and the vaporization chamber.

35. The system of claim 20 wherein the compressor is connected to a steam turbine.

36. The system of claim 35 wherein the steam turbine has a boiler heated with natural gas.

37. The system of claim 20 wherein the compressor is connected to a gas turbine.

* * * * *